June 21, 1938.  L. I. GUION, JR  2,121,290
MOUNTING
Filed July 19, 1937  2 Sheets-Sheet 1

Louis I. Guion, Jr. INVENTOR
BY Victor J. Evans & Co.
ATTORNEYS

June 21, 1938.   L. I. GUION, JR   2,121,290
MOUNTING
Filed July 19, 1937   2 Sheets-Sheet 2
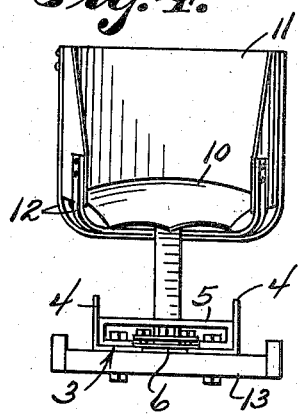
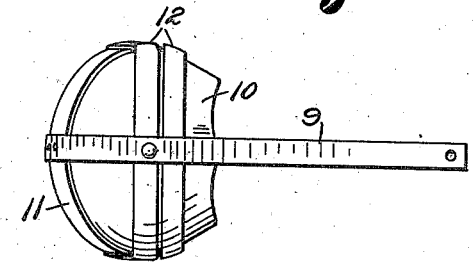
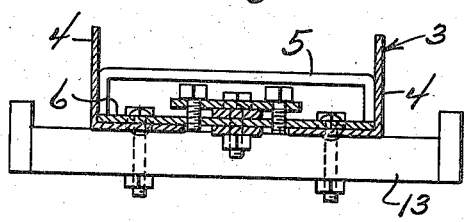
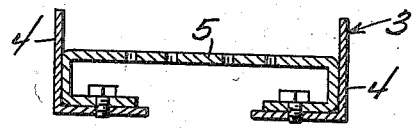
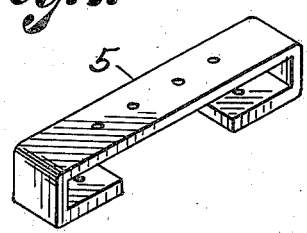
Louis I. Guion, Jr.
INVENTOR
BY Victor J. Evans & Co.
ATTORNEYS Patented June 21, 1938

2,121,290

UNITED STATES PATENT OFFICE 2,121,290

MOUNTING

Louis I. Guion, Jr., Lugoff, S. C.

Application July 19, 1937, Serial No. 154,491

1 Claim. (Cl. 280—150)

This invention relates to a mounting especially adapted for arranging on a tractor a dusting or insecticide distributing apparatus and has for the primary object the provision of a device of this character which will support the apparatus in such a manner on the tractor that said apparatus may receive power for its operation by being belted onto the power takeoff of the tractor without making alterations in the construction of the latter and also includes a seat for the operator of the apparatus whereby the operator will have sufficient room for free manipulation of the discharge medium of the apparatus.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a mounting constructed in accordance with my invention and showing the same supporting an insecticide distributing apparatus on a tractor.

Figure 4 is an end elevation illustrating the mounting.

Figure 5 is a transverse sectional view taken on the line 5—5 of Figure 2.

Figure 6 is a transverse sectional view taken on the line 6—6 of Figure 2.

Figure 7 is a perspective view illustrating one of the bed elements for securing the apparatus on the mounting.

Figure 8 is a fragmentary bottom plan view, illustrating an operator's seat carried by the mounting.

Figure 1:
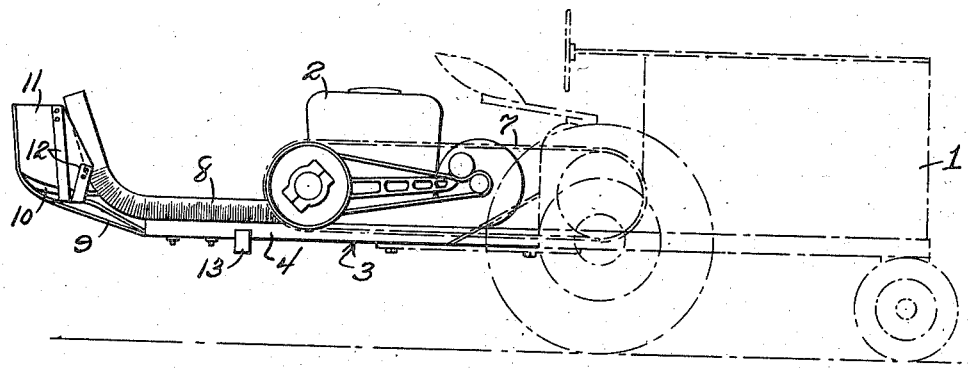
Figure 2:
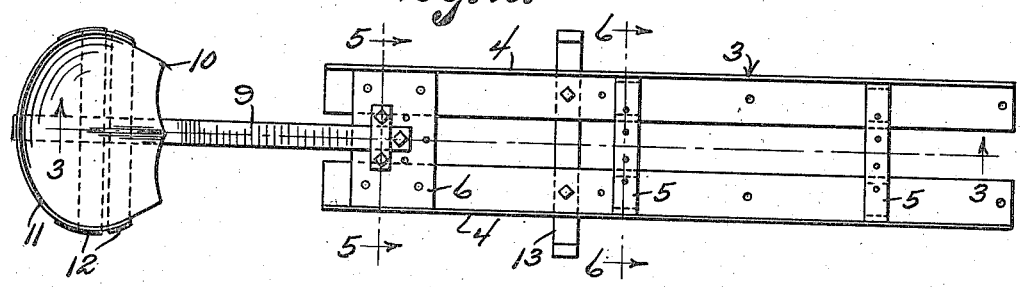
Figure 2 is a top plan view illustrating the same.
Figure 3:
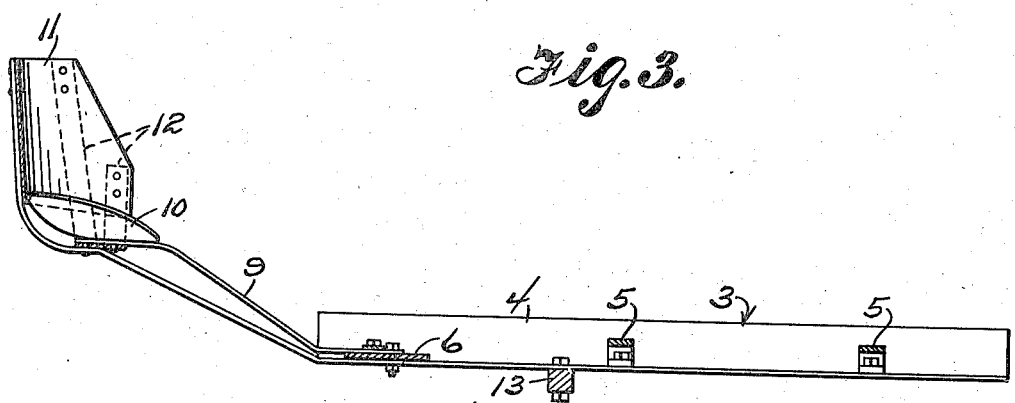
Figure 3 is a sectional view taken on the line 3—3 of Figure 2.

Referring in detail to the drawings, the numeral 1 indicates a tractor of a conventional construction and 2 an apparatus for distributing an insecticide. Heretofore, the apparatus 2 has been mounted on a wheeled vehicle and the latter coupled onto the tractor requiring a complicated drive mechanism between the apparatus and the power takeoff of the tractor. To eliminate the complicated drive and to provide a more compact and convenient assembly of the apparatus with the tractor my invention is employed and consists of a mounting 3 including relatively spaced parallel members 4 preferably constructed of angle iron and which are connected by bed members 5 and a plate 6. The bed members 5 have offset ends to position the major portions of said members in a plane above the horizontal portions of the members 4. The major portions of the members 5 have openings to receive bolts or like fasteners employed for securing on said bed members the apparatus 2. The members 4 are bolted or otherwise secured on the frame of the tractor positioning the apparatus 2 in close proximity to the rear end of the tractor so that the drive shaft of the apparatus 2 may be belted onto the power takeoff of the tractor, as shown at 7. The apparatus 2 has a flexible discharge medium 8 which may rest on the mounting, 1, when not in use. Detachably secured on the plate 6 is a seat supporting member 9 preferably having resiliency and carried thereby is a seat 10 for the operator of the apparatus. Secured to the seat 10 is a back rest 11. The back rest is secured on the seat 10 by braces 12, one of which is of an extended length and parallels the seat supporting member 9 and is secured on the plate 6.

Positioned forwardly of the plate 6 and arranged transversely of the members 4 and secured thereto is a member 13, the ends of which project beyond the members 4 to form foot rests so that the operator occupying the seat 10 may rest his feet thereon. The seat supports the operator in a position where the discharge medium 8 can be freely handled for directing the discharged insecticide to either side of the tractor.

A mounting of the character described will be durable, economical to manufacture and will efficiently support an apparatus of the character described at a convenient position on the tractor so that the tractor can be driven through narrow places and the mounting may be readily attached to and removed from the tractor when desired.

What is claimed is:

A mounting of the character described comprising parallel members detachably secured on a tractor, transverse members connecting the parallel members and certain of said transverse members forming supports for an apparatus to position the latter in close proximity to the tractor so that it may be belted onto a power takeoff of the tractor, a seat supporting member secured to one of said transverse members, a seat carried by said seat supporting member and positioned rearwardly of the parallel members, a back rest carried by said seat, and a transverse member secured to the parallel members and projecting at each end beyond said parallel members to form foot rests.

LOUIS I. GUION, JR.